United States Patent
Vander Veen

(10) Patent No.: US 7,664,491 B2
(45) Date of Patent: Feb. 16, 2010

(54) ADVANCED CALL FORWARDING USER INTERFACE FOR MOBILE COMMUNICATION DEVICE

(75) Inventor: Raymond Vander Veen, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 146 days.

(21) Appl. No.: 11/077,231

(22) Filed: Mar. 11, 2005

(65) Prior Publication Data

US 2006/0205393 A1    Sep. 14, 2006

(51) Int. Cl.
*H04M 3/42* (2006.01)
(52) U.S. Cl. ............... 455/417; 455/433; 455/414.1
(58) Field of Classification Search .......... 455/412, 455/414.1, 417; 329/201, 88
See application file for complete search history.

(56) References Cited

U.S. PATENT DOCUMENTS

| | | | | |
|---|---|---|---|---|
| 5,794,142 A | * | 8/1998 | Vanttila et al. ............. 455/419 |
| 6,091,948 A | * | 7/2000 | Carr et al. ................ 455/414.1 |
| 6,501,948 B1 | * | 12/2002 | Salin ......................... 455/417 |
| 6,603,969 B1 | * | 8/2003 | Vuoristo et al. ............. 455/433 |
| 2004/0174971 A1 | | 9/2004 | Guan | |
| 2004/0208297 A1 | | 10/2004 | Valentine | |
| 2005/0215242 A1 | | 9/2005 | Black et al. | |

OTHER PUBLICATIONS

EPO Search/Examination Report—Dec. 1, 2005.

* cited by examiner

*Primary Examiner*—David Q Nguyen
(74) *Attorney, Agent, or Firm*—Ridout & Maybee LLP

(57) ABSTRACT

A call forwarding user interface for a mobile communication device provides selective access to pre-stored identifying data (e.g., an address book) for a user to define one or more call forwarding destinations for predetermined call forwarding conditions. Call forwarding profiles of such identifying data may also be defined and stored for subsequent selective actuation. Such interface features facilitate user-defined call forwarding functions with reduced requirements for memorization and/or reference to written or printed records.

21 Claims, 9 Drawing Sheets

US 7,664,491 B2

ADVANCED CALL FORWARDING USER INTERFACE FOR MOBILE COMMUNICATION DEVICE

BACKGROUND OF THE INVENTION

1. Technical Field

This invention generally relates to a call forwarding user interface in a mobile communication device capable of effecting a call forwarded communication connection with other communication devices over a communication network

2. Related Art

Many mobile communication devices already have call forwarding capability. Upon the occurrence of a pre-defined call forwarding condition, an incoming call may be diverted or forwarded to a different communication device that has been previously identified by the user. Typically, the user interface employed for identifying the desired alternate destination telephone number or other identifying data has required the user to manually enter each digit of identifying data. If this can be done conveniently from memory or by reference to some written document, that may not present a great problem. However, if the desired alternate destination identifying data has not been memorized but, instead, is only available as some other pre-stored data within the communication device itself, then the process may become cumbersome. For example, the desired identifying data may have to be recalled for display on the device, copied onto paper or otherwise temporarily memorized by the user before it can be manually keyed in to identify the desired call forwarding destination. This can become particularly cumbersome if there are a number of different call forwarding conditions which may each be associated with a different call forwarding destination and/or if the user frequently desires to change call forwarding arrangements to meet different encountered situations.

Typically call forwarding is set up on mobile phones such that when the mobile user does not answer the phone, calls are forwarded to voice mail. Forwarding conditions for GSM phones are CFU (forward all incoming calls unconditionally), CFB (forward when busy), CFNRC (forward when not reachable), CFNRY (forward when no reply).

However, a mobile phone user may also want to forward calls to specific numbers, such as his/her home phone number, work phone number, cottage phone number, a friend's house, etc. For example, if the user is heading to a cottage and knows that there will be no cellular coverage there, he/she may want to forward all calls to the cottage land-line phone number.

Phone numbers such as those for a home, work, cottage, friend, etc. would typically already be contained in the user's address book in the mobile phone itself. However, in order to set CFU forwarding to the cottage number destination, the user must open the Cottage address book entry, copy or memorize the phone number, then open the call forwarding option, and set the CFU phone number by entering it manually.

BRIEF DESCRIPTION OF THE DRAWINGS

These and other objects and advantages of this invention will be better understood and appreciated in conjunction with the following detailed description of exemplary embodiments taken together with the accompanying drawings, of which.

DETAILED DESCRIPTION OF EXEMPLARY EMBODIMENTS

Figure 1:
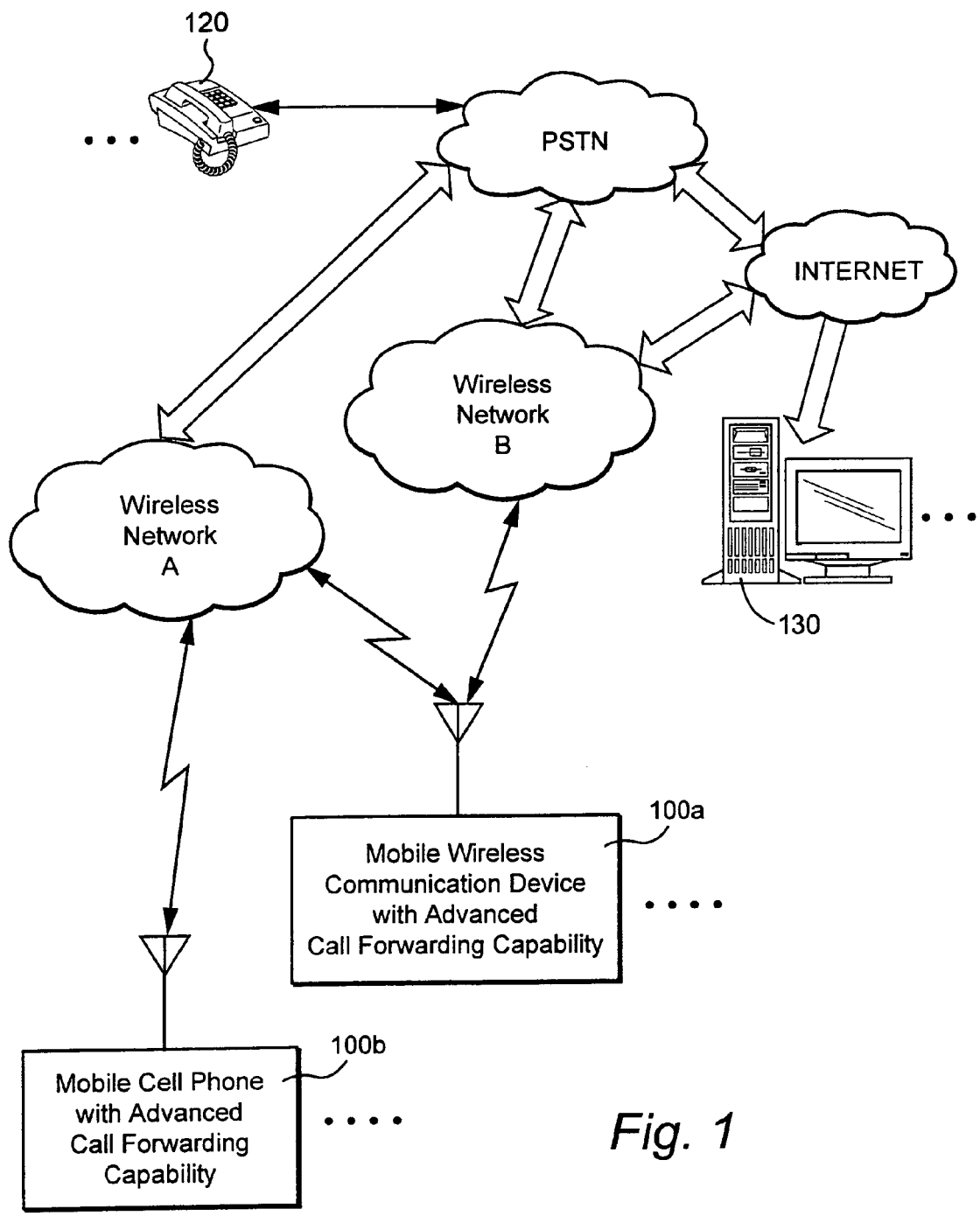
FIG. 1 is an overall system wide schematic view of an exemplary communication system incorporating mobile communication devices with enhanced call forwarding capability in accordance with one exemplary embodiment of this invention.

There is thus need for a more convenient way to access the address book directly from the call forwarding option so that it is easy for the user to forward calls to a number in the address book.

Furthermore, if a user wishes to change the forwarding settings regularly between, for example, default settings where unanswered calls are forwarded to voicemail, and a situation where all calls are forwarded to the "cottage", there is need for an easy way to save the required forwarding numbers and types into a "forwarding profile" or the like so that the user can easily toggle between the two setups. That is, if the user wants to change the forwarding numbers for CFB, CFNRC, and CRNRY from one number to another, he/she is currently required to re-enter or (reselect from a saved list) the forwarding numbers for each type. It would be easier if, once a series of forwarding numbers has been entered, that series could be saved into a "forwarding profile" so that in the future profile could be enabled, without requiring the user to re-enter or reselect each individual forwarding number.

To address various aspects of such typical problems, the exemplary embodiment of this invention provides various call forwarding user options in a mobile communication device capable of effecting a call forwarded communication connection with other communication devices over a communication network by use of identifying data associated with such devices.

For example, a communication device user may be provided with an option to define at least one call forwarding destination using (a) previously stored identifying data or (b) current user-input identifying data. Such option-selected identifying data may then be stored for future use in forwarding incoming calls to such at least one destination when a corresponding pre-defined call forwarding condition occurs.

For example, access may be provided to entries in an address book of previously stored identifying data for other user communication devices. Indeed, an option may be provided to define a call forwarding destination for each of plural pre-defined call forwarding conditions. For example, those plural pre-defined call forwarding conditions might include at least two selected from the group consisting of (a) call forwarding unconditional, (b) call forwarding when busy, (c) call forwarding when non-reachable, and (d) call forwarding when no reply.

The exemplary embodiment also provides an option to define at least one stored call forwarding profile including identifying data of a call forwarding destination for at least one corresponding pre-defined call forwarding condition. An option may also be provided then to selectively use at least one previously stored call forwarding profile. Indeed, an option may be provided to define a different name for each of plural stored profiles, each profile including a call forwarding destination for each of plural pre-defined call forwarding conditions. Such pre-defined call forwarding conditions may include at least some of those listed above.

The methodology of this invention may be embodied in apparatus and/or in a digital storage medium containing a computer program which, when executed, effects a call forwarding user interface of the type just described.

Access to the address book from the call forwarding option screen for individual forwarding types (CFU, CEB, CFNRC, CFNRY) can be provided instead of only allowing the user to enter a phone number manually. Suppose the user wants to forward all calls (CFU) to the phone number associated with a "Cottage" entry in the address book. The call forwarding option screen can provide a menu item to allow selection of a phone number from the address book, which will allow the user to select the cottage phone number.

A menu item in the call forwarding option screen such as "Create Profile", or "Save Profile" can be provided which would save the set of mappings between forwarding types and forwarding numbers to the device persistent data storage medium. For example, continuing with the cottage theme, the user may have set up CFU as follows:

Forward All Calls to: Cottage 16131234321

This setup may be saved to the device's persistent store by invoking the create profile menu item and naming it "cottage". In the future the user may want to switch to this profile. A list of profiles may be displayed and there may be a menu item provided so that the user can enable the selected profile in one step.

This invention may be embodied in hardware, software or a combination of hardware and software. The invention also provides a method for providing advanced call forwarding user interface options—especially useful in a mobile communication device. The exemplary embodiment is realized, at least in part, by executable computer program code which may be embodied in physical program memory media.

As those in the art will appreciate, modern communication systems may embody extremely complex diverse and widely scattered components, devices, networks and the like. A very simplified exemplary schematic depiction of one such arrangement is shown in FIG. 1. Here, mobile wireless communication devices 100a (e.g., mobile cell phones 100b) and the like make wireless connection with various wireless networks such as wireless network A and/or wireless network B. These wireless networks may, in turn, be connected via various gateways to a public switched telephone network (PSTN), each other, the Internet, etc. So called "land-line" relatively immobile telephones 120 may be connected to the various networks and may also have various degrees of sophistication including call forwarding capabilities. Various types of computers 130 may also be connected in various ways to such interconnected networks and they may also include call forwarding capabilities.

The exemplary embodiment of this invention is particularly concerned with advanced call forwarding user interface for mobile communication devices such as 100a, 100b and the like. A very abbreviated and schematic depiction of circuitry typically found within such mobile communication devices is depicted at FIG. 2.

Figure 2:
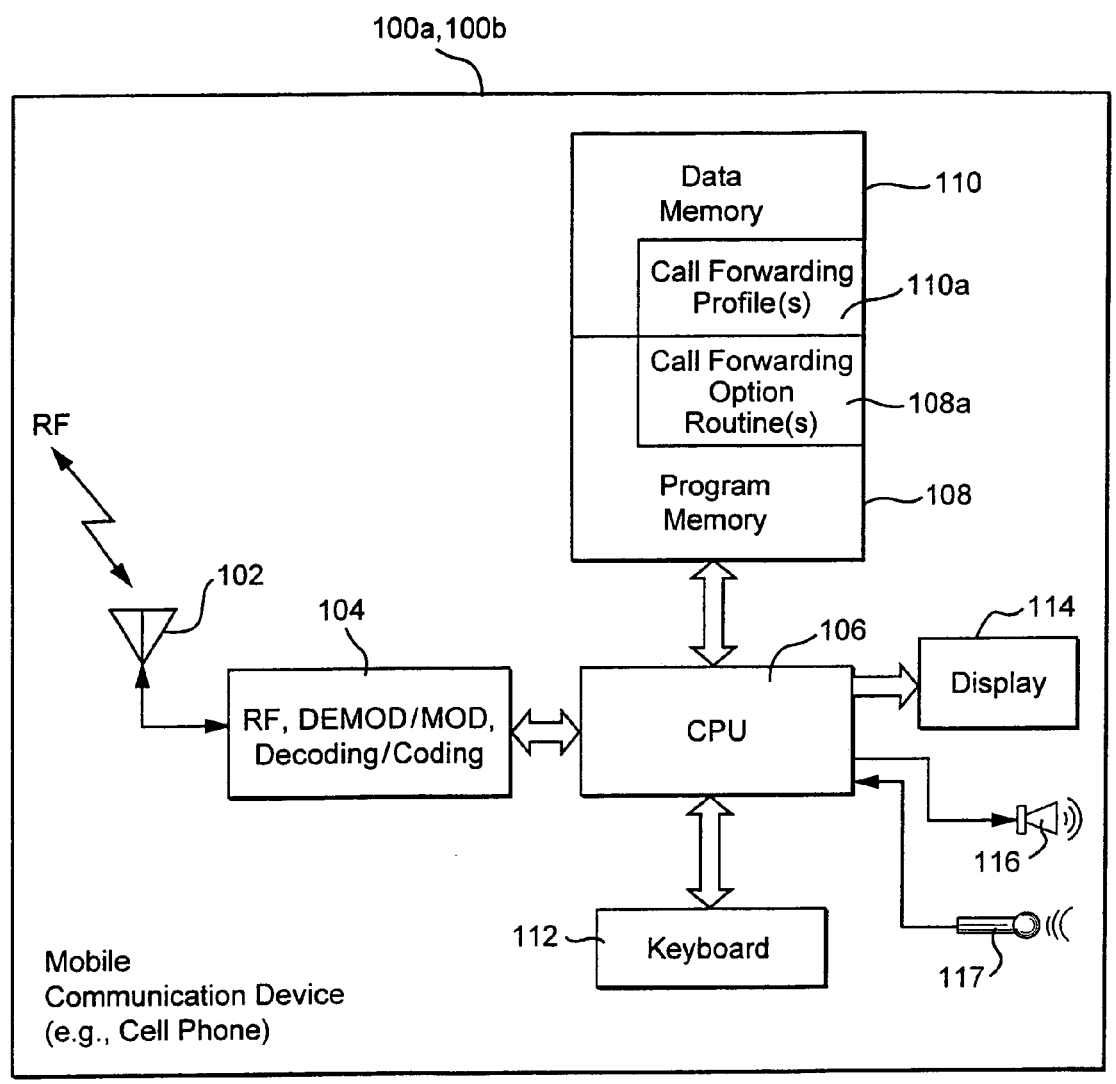
FIG. 2 is an abbreviated schematic diagram of hardware included within an exemplary mobile communication device of FIG. 1.

As depicted in FIG. 2, mobile communication device 100a, 100b includes a suitable RF antenna 102 for wireless communication to/from wireless networks A and/or B. Conventional RF, demodulation/modulation and decoding/coding circuits 104 are provided. As those in the art will appreciate, such circuits can involve possibly many digital signal processors (DSPs), microprocessors, filters, analog and digital circuits and the like. However, since such circuitry is well known in the art, it is not further described.

The mobile communication device 100a, 100b may also typically include a main control CPU 106 which operates under control of a stored program in program memory 108 (and which has access to data memory 110). CPU 106 also communicates with a conventional keyboard 112, display 114 (e.g., an LCD) and audio transducers such as speaker 116 and microphone 117. Suitable computer program executable code is stored in portions of program memory 108a to provide an advanced call forwarding user interface. A portion of data memory 110a may be used for storing one or more address books of user identifying data, call forwarding profiles and/or data for use in generating user interface screen displays.

Figure 3A:
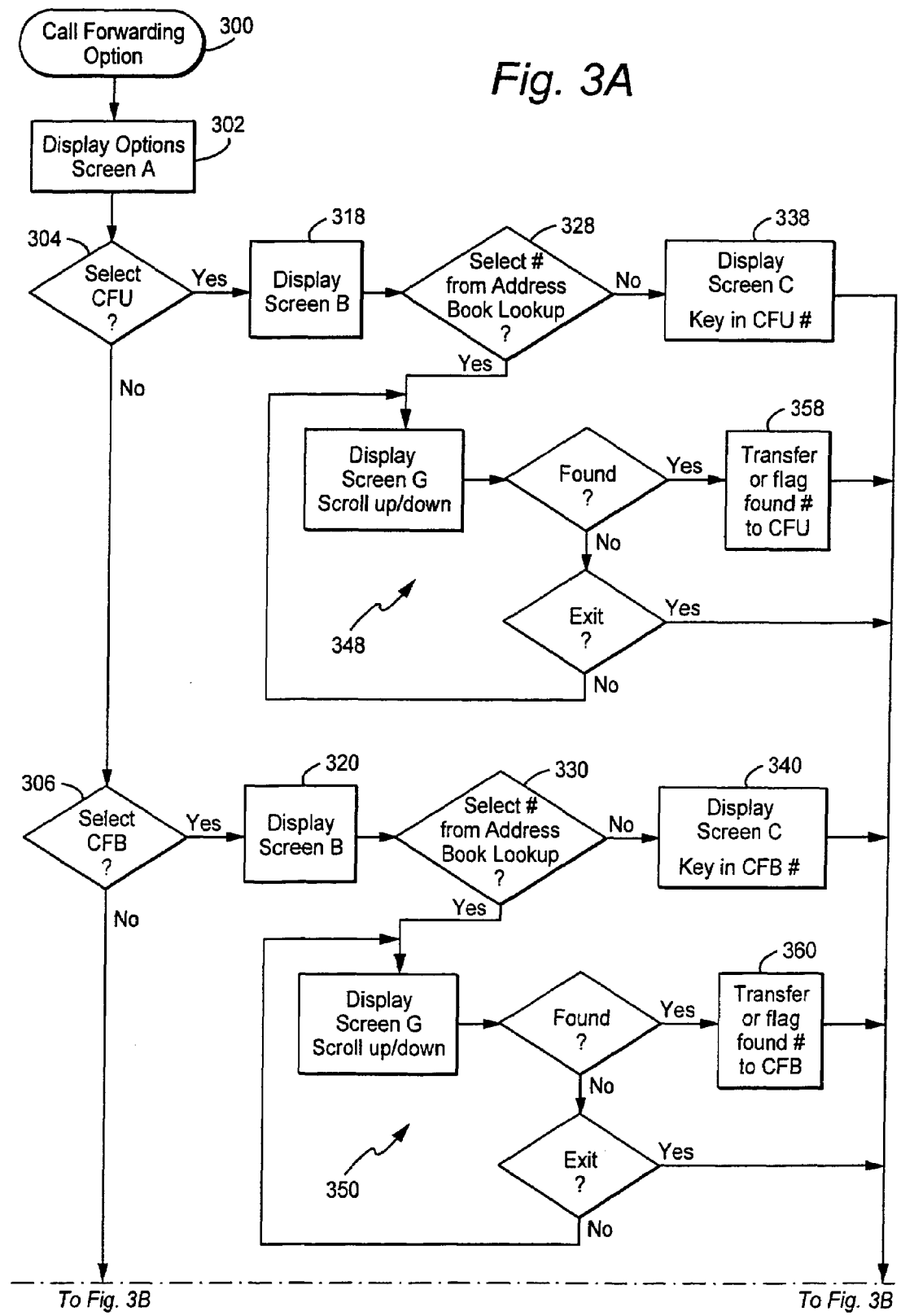
FIGS. 3A-3C provide an exemplary abbreviated schematic flow diagram of computer software (i.e., program logic) that may be utilized in the user's mobile communication device of FIG. 1.
Figure 3B:
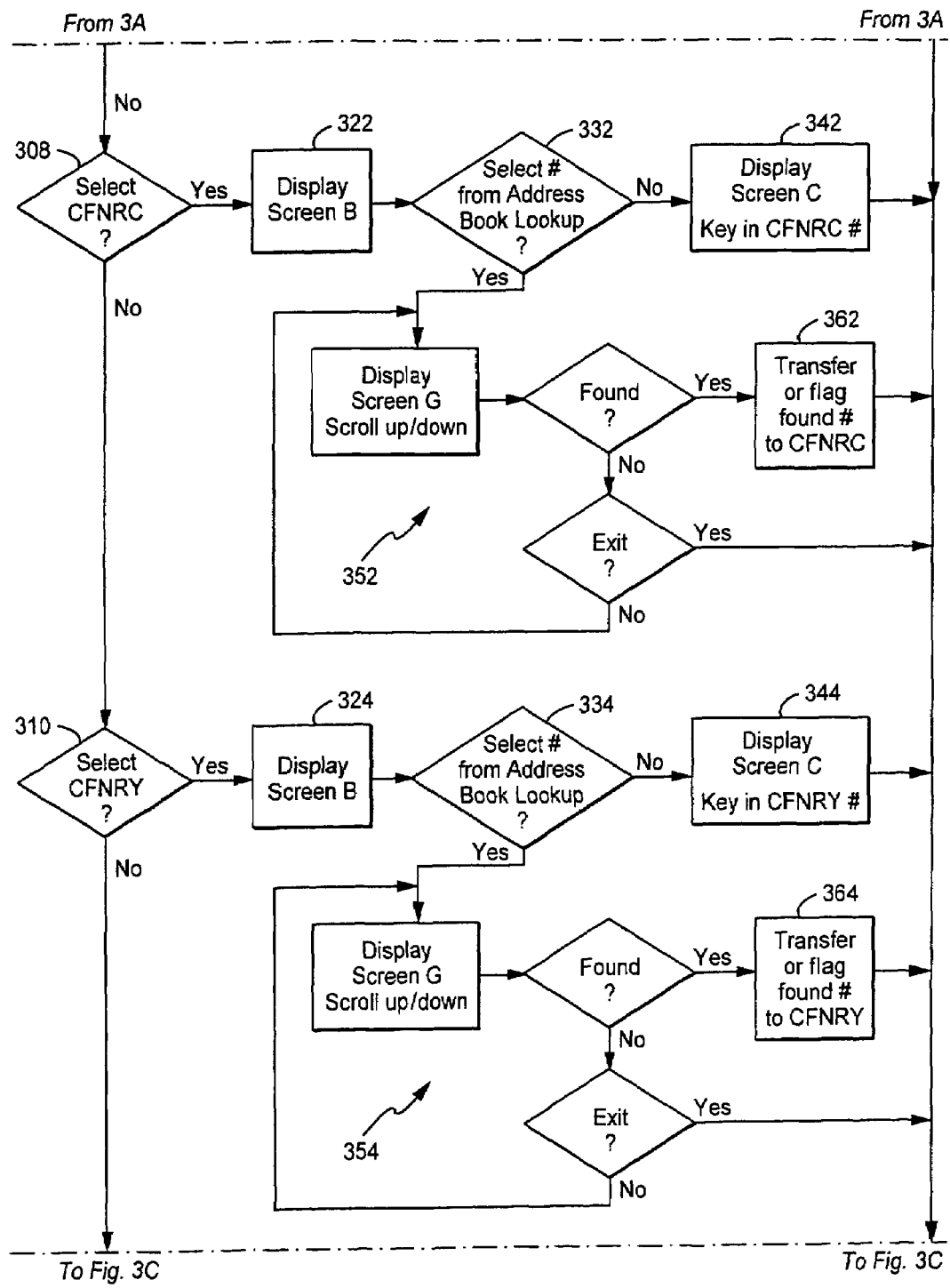
Figure 3C:
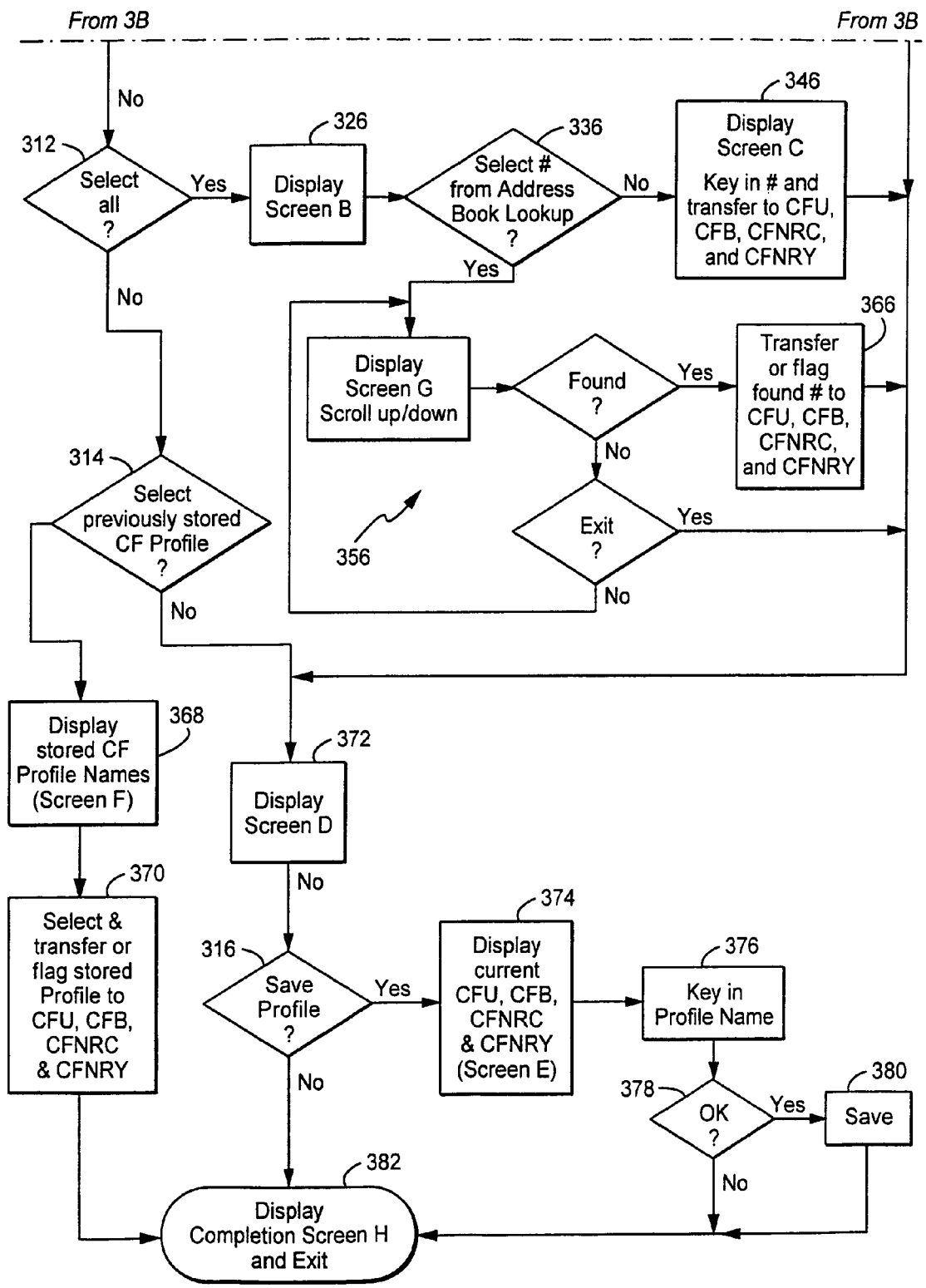
Figure 4:
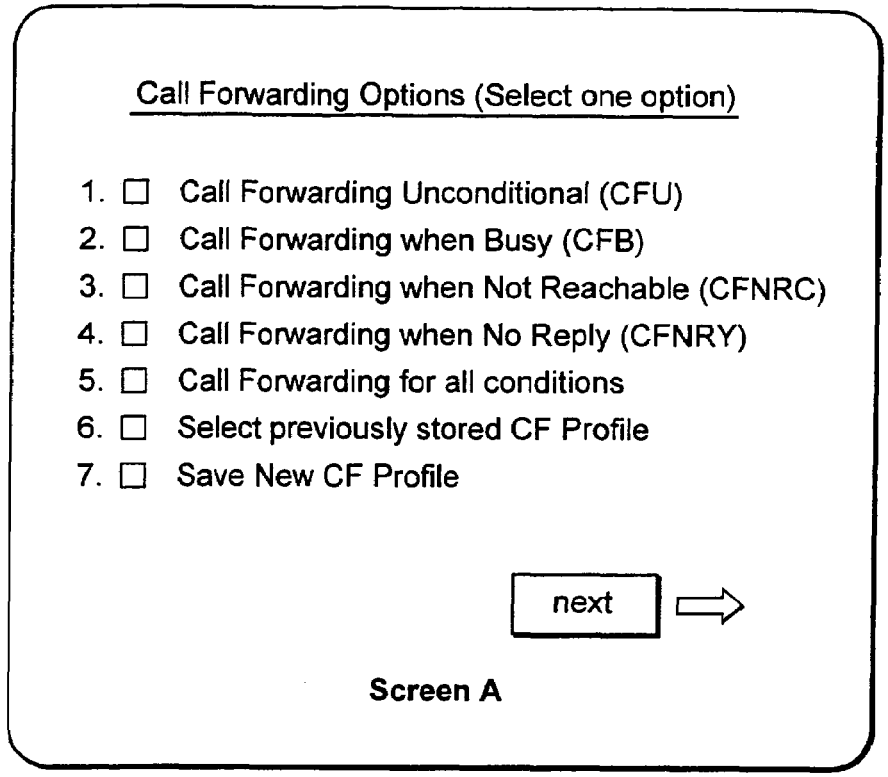
FIGS. 4-11 are exemplary abbreviated schematic depictions of user interface screen displays A-H that may be utilized in association with the program logic of FIGS. 3A-3C.
Figure 5:
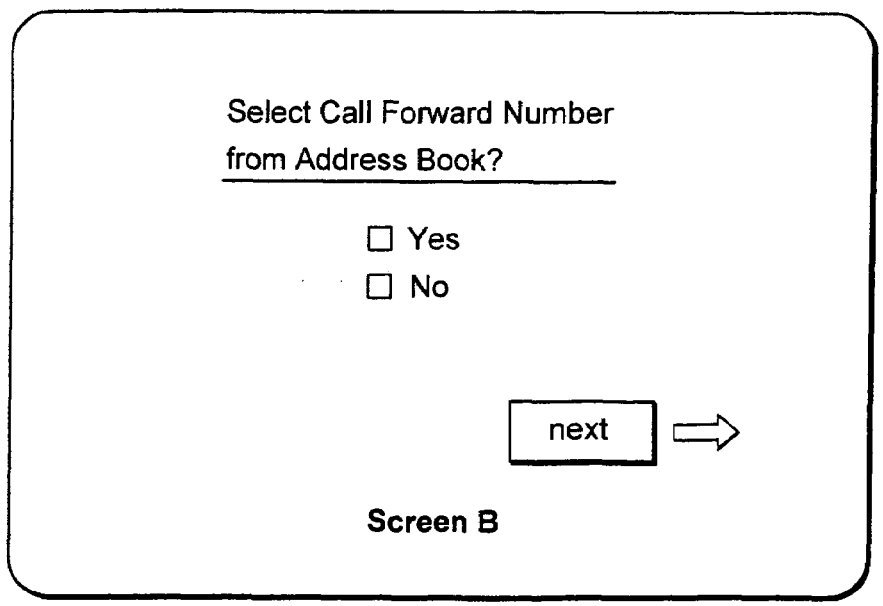
Figure 6:
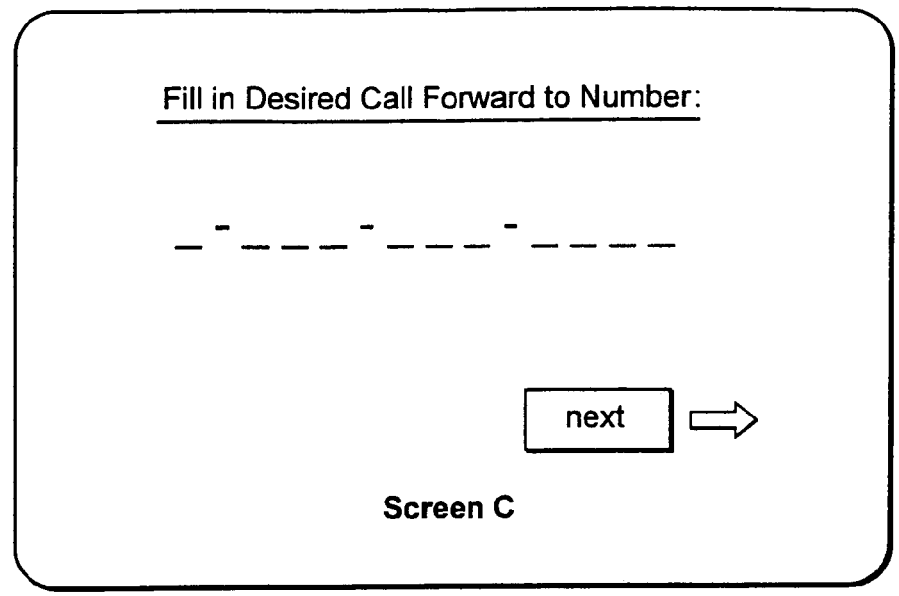

As depicted in FIGS. 3A-3C, upon entry to the call forwarding option program logic at 300, an option screen A (FIG. 4) is displayed at 302. As depicted in FIG. 4, this option screen permits the user to select one of several options before activating the "next" function. In the exemplary embodiment depicted here, seven different options are provided and once the user passes on to the next screen, tests are made respectively at 304, 306, 308, 310, 312, 314 and 316 in the program logic of FIGS. 3A-3C so as to identify which option was selected by the user. The first five of those options, if selected, will then display screen B (FIG. 5) at blocks 318, 320, 322, 324 and 326 to give the user an option to select call forwarding identification data from a pre-stored address book. When the next screen of FIG. 5 is activated by the user, a test is made at 328, 330, 332, 334 and 336 to see whether the address book is to be consulted. If not, then screen C (FIG. 6) is displayed at 338, 340, 342, 344 and 346 to permit the user to manually key in the desired call forwarding destination identifying data which is then stored in association with the appropriate call forwarding condition (CFU; CFB; CFNRC; CFNRY; or a plurality of such conditions).

Figure 10:

If address book access has been selected by the user, then screen G (FIG. 10) is displayed and conventional scroll up/down user selection functionality 348, 350, 352, 354 or 356 is executed resulting in the selected identifying data being transferred (or flagged) to an appropriate current use position in storage (e.g., associated with the appropriate call forwarding condition 358, 360, 362, 364 or 366 in FIGS. 3A-3C.

Figure 9:

If the sixth option has been selected by user, then a branch will be taken from the program logic in FIG. 3C as shown at 314 to block 368 where screen F (FIG. 9) is displayed so as to give the user an option to select and transfer (or flag) the appropriately pre-stored profile identifying data as depicted at 370.

Figure 7:
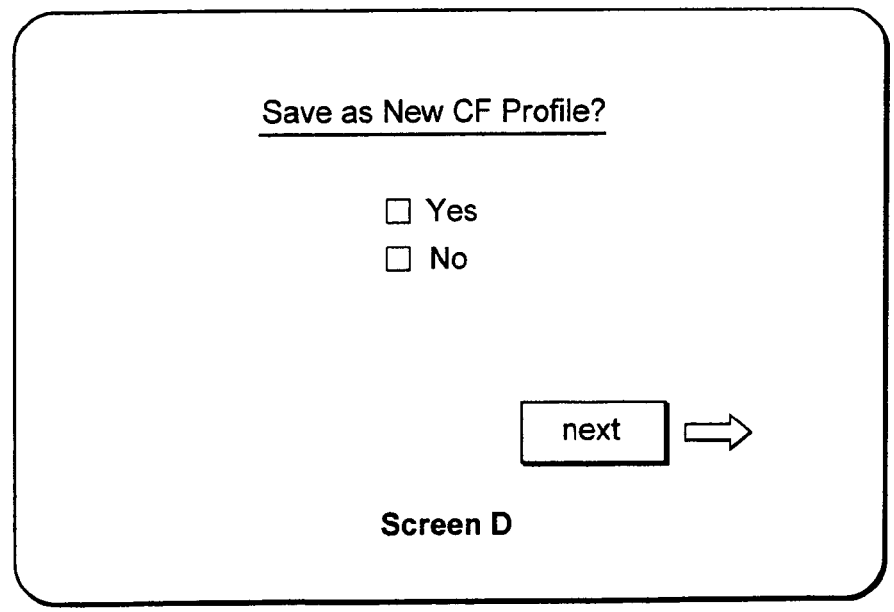
Figure 8:
Figure 11:

If the seventh option has been selected by the user in screen A, then the program logic will ultimately lead to block 372 in FIG. 3C where screen D (FIG. 7) is displayed so as to give the user an option to save a new call forwarding profile. If this option is taken, then at block 374 screen E (FIG. 8) is displayed so as to identify the values to be associated with each call forwarding condition and provide an opportunity to key in a desired new profile name at 376. The user is also given an option at 378 to confirm that all of this data is correct and desired. If everything is as desired, then the new profile name and data is saved at 380 and, at a common exit point 382, a final finish screen H (FIG. 11) is shown to the user before exit is taken from the call forwarding option sub-routine.

Those in the art will appreciate that the above description of one or more presently preferred exemplary embodiments may be made modified in many respects while yet retaining novel features and advantages. Accordingly, all such modifications are intended to be included within the scope of the appended claims.

What is claimed is:

1. A method for user programming of call forwarding instructions on a mobile communication device capable of forwarding incoming calls according to a call forwarding profile of call forwarding destinations for each of a plurality of pre-defined call forwarding conditions, the method comprising:

providing a menu on the mobile communication device to program call forwarding instructions for incoming calls, the menu including a plurality of options to define the call forwarding profile by one of
  (a) user input of individual digits of multi-digit identifying data or,
  (b) user selection of existing entries of multi-digit identifying data internally stored in a data memory of the mobile communication device;

providing a user option to store the defined call forwarding profile in the data memory of the device and define a different name for each stored call forwarding profile; and using the programmed multi-digit identifying data to forward incoming calls to one of the defined call forwarding destinations when a corresponding pre-defined call forwarding condition is detected for an incoming call;

wherein the call forwarding profile includes selected call forwarding conditions from the group consisting of:
  (A) call forwarding unconditional,
  (B) call forwarding when the mobile device is in use,
  (C) call forwarding when the mobile device is not reachable, and
  (D) call forwarding when the mobile device is not answered in a predetermined period of time.

2. A method as in claim 1 wherein the providing the menu comprises:
providing for user access to, and use of, entries in a phone book of previously stored identifying data for other communication devices during use of option (b).

3. A method as in claim 1 wherein the providing the menu further comprises:
providing, during option (b), an opportunity to selectively use at least one previously stored call forwarding profile.

4. A method as in claim 1 wherein the data memory of the device comprises persistent data memory.

5. A method as in claim 1 wherein the existing entries of multi-digit identifying data are internally stored in the data memory in an address book.

6. A method as in claim 1 wherein the call forwarding profile includes at least three selected call forwarding conditions from the group consisting of:
  (A) call forwarding unconditional,
  (B) call forwarding when the mobile device is in use,
  (C) call forwarding when the mobile device is not reachable, and
  (D) call forwarding when the mobile device is not answered in a predetermined period of time.

7. An apparatus for user programming of call forwarding instructions on a mobile communication device capable of forwarding incoming calls according to a call forwarding profile of call forwarding destinations for each of a plurality of pre-defined call forwarding conditions, the apparatus comprising a main control CPU adapted to:

provide a menu on the mobile communication device to program call forwarding instructions for incoming calls, the menu including a plurality of options to define the call forwarding profile by one of
  (a) user input of individual digits of multi-digit identifying data or,
  (b) user selection of existing entries of multi-digit identifying data internally stored in a data memory of the mobile communication device;

provide a user option to store the defined call forwarding profile in the data memory of the device and define a different name for each stored call forwarding profile; and forward, using the programmed multi-digit identifying data, incoming calls to one of the defined call forwarding destinations when a corresponding pre-defined call forwarding condition is detected for an incoming call;

wherein the call forwarding profile includes selected call forwarding conditions from the group consisting of:
  (A) call forwarding unconditional,
  (B) call forwarding when the mobile device is in use,
  (C) call forwarding when the mobile device is not reachable, and
  (D) call forwarding when the mobile device is not answered in a predetermined period of time.

8. An apparatus as in claim 7 wherein the main control CPU is further adapted to:
provide user access to, and use of, entries in an address book of previously stored identifying data for other communication devices during use of option (b).

9. An apparatus as in claim 7 wherein the main control CPU is further adapted to:
provide, during option (b), an opportunity to selectively use at least one previously stored call forwarding profile.

10. An apparatus as in claim 7 further comprising a persistent data memory adapted to store the defined call forwarding profile.

11. An apparatus as in claim 7 wherein the existing entries of multi-digit identifying data are internally stored in the data memory in an address book.

12. A digital storage medium containing a computer program which, when executed by a mobile device, provides for user programming of call forwarding instructions on the mobile communication device capable of forwarding calls according to a call forwarding profile of call forwarding destinations for each of a plurality of pre-defined call forwarding conditions, wherein execution of the program:

provides a menu on the mobile communications device to program call forwarding instructions for incoming calls, the menu including a plurality of options to define the call forwarding profile by one of
  (a) user input of individual digits of multi-digit identifying data or
  (b) user selection of one of existing entries of multi-digit identifying data internally stored in a data memory of the mobile communication device;

provides a user option to store the defined call forwarding profile in the data memory of the device and define a different name for each stored call forwarding profile; and uses the programmed multi-digit identifying data to forward incoming calls to one of the defined call forwarding destinations when a corresponding pre-defined call forwarding condition is detected for an incoming received call;

wherein the call forwarding profile includes selected call forwarding conditions from the group consisting of:
  (A) call forwarding unconditional,
  (B) call forwarding when the mobile device is in use, (C) call forwarding when the mobile device is not reachable, and (D) call forwarding when the mobile device is not answered in a predetermined period of time.

13. A digital storage medium as in claim 12 wherein execution of the program:

provides for user access to, and use of, entries in a phone book of previously stored identifying data for other communication devices during use of option (b).

14. A digital storage medium as in claim 12 wherein execution of the program:

provides, during option (b), an opportunity to selectively use at least one previously stored call forwarding profile.

15. A digital storage medium as in claim 12 wherein execution of the program further provides a user option to store the defined call forwarding profile in a persistent data memory of the device.

16. A digital storage medium as in claim 12 wherein the existing entries of multi-digit identifying data are internally stored in the data memory in an address book.

17. A method for programming a call forwarding profile on a mobile communication device, the profile comprising call forwarding destinations for a plurality of call forwarding conditions detectable on receipt of an incoming call, the method comprising:

providing a menu on the mobile communication device to program the call forwarding profile, the menu including a plurality of options to define a call forwarding destination for each of the plurality of call forwarding conditions by one of (a) manual input or (b) selection of a destination stored in a data memory of the mobile communications device, wherein when definition of the call forwarding profile is complete, the user is provided an option to store the defined call forwarding profile in the data memory of the device by a different name for each stored call forwarding profile; and using the call forwarding profile to forward incoming calls from the mobile communications device to defined call forwarding destinations when a corresponding call forwarding condition is detected;

wherein the call forwarding profile includes selected call forwarding conditions from the group consisting of:

(A) call forwarding unconditional, (B) call forwarding when the mobile device is in use, (C) call forwarding when the mobile device is not reachable, and (D) call forwarding when the mobile device is not answered in a predetermined period of time.

18. The method of claim 17, wherein the menu includes an option to activate a previously stored call forwarding profile.

19. A method as in claim 17 wherein the data memory of the device comprises persistent data memory.

20. A method as in claim 17 wherein the destination comprises an existing entry of multi-digit identifying data.

21. A method as in claim 20 wherein the existing entry of multi-digit identifying data is stored in the data memory in an address book.

* * * * *